(12) United States Patent
Yazaki et al.

(10) Patent No.: US 7,587,511 B2
(45) Date of Patent: *Sep. 8, 2009

(54) BANDWIDTH MONITORING METHOD AND ITS DEVICE

(75) Inventors: Takeki Yazaki, Hachioji (JP); Takeshi Aimoto, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 797 days.

This patent is subject to a terminal disclaimer.

(21) Appl. No.: 10/874,219

(22) Filed: Jun. 24, 2004

(65) Prior Publication Data

US 2004/0228274 A1    Nov. 18, 2004

Related U.S. Application Data

(63) Continuation of application No. 09/585,389, filed on Jun. 2, 2000, now Pat. No. 7,340,529.

(30) Foreign Application Priority Data

Jun. 2, 1999    (JP)    ................... 11-154657

(51) Int. Cl.
G06F 15/16    (2006.01)
H04B 3/46    (2006.01)

(52) U.S. Cl. .................. 709/232; 709/224; 370/235

(58) Field of Classification Search ......... 709/230–235, 709/207; 370/230–235.1
See application file for complete search history.

(56) References Cited

U.S. PATENT DOCUMENTS

| 5,524,006 | A | 6/1996 | Hluchyj et al. |
| 5,812,525 | A | 9/1998 | Teraslinna |
| 6,023,456 | A | 2/2000 | Chapman et al. |
| 6,091,709 | A * | 7/2000 | Harrison et al. ............. 370/235 |
| 6,147,970 | A * | 11/2000 | Troxel ........................ 370/235 |
| 6,381,214 | B1 | 4/2002 | Prasad |

FOREIGN PATENT DOCUMENTS

JP    10-178430    6/1998

OTHER PUBLICATIONS

"An Architecture for Differential Services", rfc 2475 of IETF.
"Function and Procedure for Traffic Management", Traffic Management Specification Version 4.0 pp. 31-48, ATM Forum Technical Committee.
Metz, C., "IP QOS: Traveling in Firt Class on the Internet", IEEE Internet Computing, Mar.-Apr. 1999, IEEE, USA, vol. 3, No. 2, pp. 84-85, XP002175015 ISSN: 1089-7801.

(Continued)

*Primary Examiner*—David Lazaro
(74) *Attorney, Agent, or Firm*—Mattingly & Malur, P.C.

(57) ABSTRACT

A bandwidth monitoring device for use in a network for transferring priority packets in preference to non priority packets as far as the amount of the priority packets is within a contract bandwidth established between a network user and a network operator, comprising a bandwidth check result decision unit for detecting whether the bandwidth of the priority packets is less than the contract bandwidth, and a DSCP decision unit for determining that a non priority packet may be transferred as a priority packet when the bandwidth of the priority packets is less than the contract bandwidth thereby to sufficiently use the contract bandwidth.

9 Claims, 13 Drawing Sheets

OTHER PUBLICATIONS

Sato, Hiroaki et al, "Study of VC/VP Interface Architecture Support of multi-QOS", IEICE Technical Report SSE94-47, May 1994, 15 pages.

Soumiya, Toshio et al, "A Quality Control in the ATM Switching System", IEICE Technical Report SSE95-59, IN95-30, CS95-79, Sep. 1995, 20 pages.

* cited by examiner

Transmit packets of the mesh part as High Priority Packets

Transmit packets of the mesh part as High Priority Packets

Transmit cells of the mesh part as CLP=0 cells

Transmit cells of the mesh part as CLP=0 cells

Transmit cells of the mesh part as CLP=0 cells

BANDWIDTH MONITORING METHOD AND ITS DEVICE

This is a continuation of U.S. Ser. No. 09/585,389, filed on Jun. 2, 2000.

BACKGROUND OF THE INVENTION

1. Field of the Invention

The present invention relates to a bandwidth monitoring method for monitoring a bandwidth for each packet which flows into a network, and a bandwidth monitoring device therefor.

2. Description of the Related Art

Traffics (packets), which flow over an Internet, are increasing rapidly with an increase in Internet users. In a packet type communication system employed in the Internet, packets sent from a large number of users can be transmitted through the use of the same line. It is therefore possible to reduce the cost per bandwidth. With a view toward achieving the low cost of the packet type communication system, moves have been made to integrate telecommunication networks and enterprise networks which have heretofore been achieved by private networks, into one by the Internet thereby to implement a reduction in communication cost. It is necessary to implement quality of service (QoS) such as low latency, low discard probability, etc. which have been achieved by the conventional telecommunication networks or enterprise networks for the purpose of integrating these into one.

As a prior art related to QoS, there is known, for example, a Diffserv (Differentiated Service) (hereinafter called prior art 1) described in RFC2475 of IETF (Internet Engineering Task Force). The prior art 1 describes that traffics (packets) are divided into classes by a source/destination IP address, a source/destination port number, a protocol, etc. in a TCP/IP header at an entrance of a network which provides services, and forwarding operations are assigned thereto. Further, the prior art 1 also describes that each packet is transferred based on a transfer or forwarding operation related to a DSCP (Differentiated Service Code Point) in a header in the network.

A node at the entrance of the network assigns preferentially packet-transferred forwarding operations to packets each of which needs low latency and low discard probability, and each node lying within the network forwards the packets preferentially, whereby the low latency and low discard probability of the packets can be achieved. Incidentally, packets to which preferentially packet-transferred forwarding operations are assigned, and packets other than the packets will be called priority packets and non priority packets respectively.

A network for implementing QoS makes a contract for a bandwidth of priority packets with a user. The node at the entrance of the network has the function of performing bandwidth monitoring and performs monitoring at the bandwidth (bandwidth monitoring or check). The bandwidth monitoring function has been described in, for example, the prior art 1.

The prior art 1 describes that a contract for forwarding-operation decision rules (for example, voice packets are transferred preferentially, etc.), a bandwidth, etc. (TCA: Traffic Conditioning Agreement) is established between the user and the network, and the node at the entrance of the network discards packets or changes DSCP so as to satisfy the TCA. Owing to the bearing of the bandwidth monitoring function by the node at the entrance of the network, a large amount of priority packets sent by one user can be prevented from flowing into the network, and QoS of priority packets sent from other users is achieved.

The bandwidth monitoring function is common as an ATM (Asynchronous Transfer Mode). Bandwidth monitoring executed in the ATM has been described in, for example, Chapter 4.5 of The ATM Forum Specification version 4.0 (hereinafter called prior art 2). In a VBR (Variable Bit Rate) service described in the prior art 2, a user makes a contract for a maximum bandwidth (PCR: Peak Cell Rate) and an average bandwidth (SCR: Sustainable Cell Rate) with a network. The user sends out each cell with CLP (Cell Loss Priority) indicative of priority of a cell discard in a cell header as priority (=0: hard to discard a cell) and non priority (=1: easy to generate a discard) according to the degree of importance. Further, the prior art 2 describes that packets having CLP=0 are monitored at an average cell rate, thereby to discard a violation packet (called VBR0.2) or to set the CLP of violation cells to "1" (called VBR. 3). By allowing a node at an entrance of a network to hold such a bandwidth monitoring function, QoS in an ATM network is achieved.

In the prior art 1, the user might not be able to sufficiently use the contract bandwidth when the DSCP is judged according to the forwarding-operation decision rules. A description will be made of a case in which a bandwidth for priority packets is contracted under the decision rules for determining the voice packets as the priority packets and the packets other than the voice packet as the non priority packets.

The bandwidth monitoring device having the bandwidth monitoring function according to the prior art 1 judges voice packets lying within a monitoring bandwidth as priority packets, and voice packets at the monitoring bandwidth or higher and packets other than the voice packets as non priority packets. When traffics sent out by a user are shown in FIG. 8(a), traffics subsequent to the passage of the bandwidth monitoring function are represented as shown in FIG. 8(b). Packets other than the voice packets indicated by diagonally-shaded portions shown in FIG. 8(b) are transmitted as non priority packets regardless of the fact that the priority packets fall within the monitoring bandwidth. Namely, the user is not able to sufficiently use the contract bandwidth for each priority packet.

On the other hand, even the prior art 2 will cause a problem similar to the above. The bandwidth monitoring device having the bandwidth monitoring function according to the prior art 2 transmits only cells with CLP=0 within the monitoring bandwidth as CLP=0. When traffics sent out by a user are given as shown in FIG. 15(a), traffics subsequent to the passage of the bandwidth monitoring function are represented as shown in FIG. 15(b). Cells corresponding to the diagonally-shaded portions in FIG. 15(b) are transmitted as cells with CLP=1 regardless of the fact that the amount of cells with CLP=0 is within the limit of the monitoring bandwidth. Namely, the user is not able to sufficiently utilize a contract bandwidth with CLP=0.

SUMMARY OF THE INVENTION

As described above, the prior art could not provide such a service that the network operator could effectively use the contract bandwidth. Therefore, a first object of the present invention is to provide a service allowable an effective use of a contract bandwidth.

Further, the prior art could not provide a bandwidth monitoring device capable of providing a service allowable an effective use of a contract bandwidth. A second object of the present invention is to provide a bandwidth monitoring device by which a network operator is able to provide a service allowable effective use of a contract bandwidth.

The first object is solved by the following method.

In a network wherein priority packets each having a packet header in which a priority field is set as priority, is preferentially transferred as compared with packets other than the priority packet, monitoring is carried out on a bandwidth for each packet flowing into the network for which a network operator who manages the network makes a contract for a bandwidth of priority packets with a network user utilizing the network. When the network user transmits priority packets and the other packets to the network, the priority fields of some packets other than the priority packets are re-set to a value corresponding to that of the priority field of the priority packet. Described more specifically, when the amount of the priority packets falls within the limit of the contract bandwidth, the priority field of some packets other than the priority packet is rewrite to the value corresponding to that of the priority field of the priority packet.

When the network user transmits packets to the network without setting a value in the priority field and priority packets are determined according to a priority packet decision policy contracted between the network operator and the network user, a value corresponding to the priority field of the priority packet is set to the priority field of some packets judged as non-priority packets.

When the network user transmits packets to the network without setting a value in the priority field and a bandwidth of packets judged as priority packets in accordance with the priority packet decision policy contracted between the network operator and the network user is less than the contract bandwidth, a value corresponding to the priority field of the priority packet is set to the priority field of some packets judged as non-priority packets.

Further, a leaky bucket algorithm having a plurality of bucket depths is used as an algorithm for the bandwidth monitoring system, and the depth of the bucket is switched in accordance with each input packet.

In order to achieve the second object, a bandwidth monitoring device according to the present invention comprises flow detecting means for detecting a flow of a series of packets based on at least one of its address information, use identification information and network priority information identifying the priority of the packet in the network, and for determining a flow identifier indicative of an identifier of each flow and a packet priority within the flow, a bandwidth check or monitoring table having one or a plurality of entries each comprising bandwidth check control information indicative of control information for bandwidth check and a plurality of the network priorities, bandwidth check table control means for reading out an entry corresponding to the flow identifier from the bandwidth check table, check result decision means for judging whether the input packets conform to or violate the contract bandwidth based on the packet priority, bandwidth check control information within the entry read out by the bandwidth check table control means, and a value of a timer for indicating the present time, and priority decision means for determining a network priority of the input packet based on the judging result of the check result decision means and a plurality of network priorities read out by the bandwidth check table control means.

Further, a bandwidth monitoring device according to the present invention comprises connection priority decision means for determining a packet priority indicative of priority of a packet within the connection from connection information of each input packet, a bandwidth check table having one or a plurality of entries each comprising bandwidth check control information indicative of control information for bandwidth monitoring and network priorities information for identifying a plurality of priorities in the network, bandwidth check table control means for reading out an entry corresponding to an identifier for the connection from the bandwidth check table, check result decision means for judging whether the input packet conform to or violate the contract bandwidth, based on the priority within the connection, bandwidth check control information within the entry read out by the bandwidth check table control means, and a value of a timer for indicating the present time, and priority decision means for determining the network priority of the input packet based on the judging result of the check result decision means and a plurality of network priorities read out by the bandwidth check table control means.

Furthermore, a bandwidth monitoring device according to the present invention is characterized in that a leaky bucket algorithm having a plurality of bucket depths is used as an algorithm for the bandwidth monitoring to be carried out by the check result decision means, and a bucket depth for priority packets and a bucket depth for packets other than the priority packets are prepared as the bandwidth check control information.

Besides, the problems to be solved by the present application and means for solving them will become apparent from the description of the embodiments of the invention and the accompanying drawings.

BRIEF DESCRIPTION OF THE DRAWINGS

FIG. 8(*b*) is a diagram showing the variation with the passage of time in traffics after passing through a bandwidth monitoring unit to which the prior art 1 is applied;

FIG. 8(*c*) is a diagram showing the variation with the passage of time in traffics after passing through a router having the bandwidth monitoring unit 141 to which the present invention is applied;

FIG. 13(c) is a diagram showing the variation with the passage of time in traffics after passing through a router having the bandwidth monitoring unit 941 to which the present invention is applied;

DESCRIPTION OF THE PREFERRED EMBODIMENTS

A summary of a router according to the present invention, which has a bandwidth monitoring function, will first be described using FIGS. 1, 3 and 4.

Figure 1:
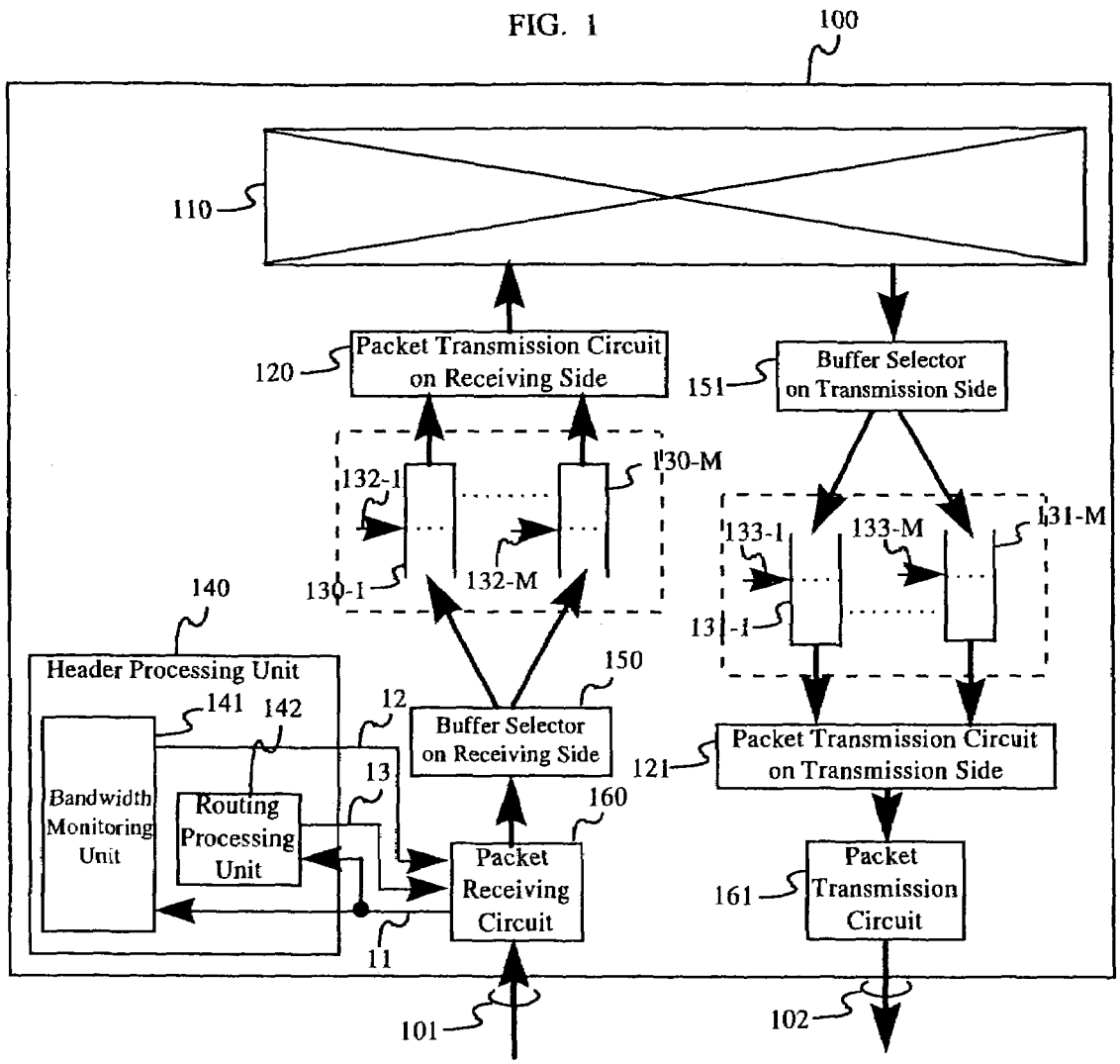
FIG. 1 is a block diagram showing a configuration of a router according to the present invention.

FIG. 1 shows a router 100 according to the present invention. The router 100 comprises an input line 101 to which packets are inputted, a packet receiving circuit 160 for performing processing to receive the packets, M buffers on receiving side 130-i (where i=1 to M), a buffer selector on receiving side 150 for distributing the packets to the buffers on receiving side 130-i, a header processing unit 140 for determining a DSCP indicative of priority in a network and an output line number as an identifier of a line for outputting the packet, a packet transmission circuit on receiving side 120 for reading out the packets from the buffers on receiving side 130-i, packet forwarding processing means 110 for switching the packets based on the output line number, M buffers on transmission side 131-i (where i=1 to M), a buffer selector on transmission side 151 for distributing the packets to the buffers on transmission side 131-i, a packet transmission circuit on transmission side 121 for reading out the packets from the buffers on transmission side 131-i, a packet transmission circuit 161 for performing processing to transmit the packets, and an output line 102 from which packets are outputted.

Although FIG. 1 shows a pair of the input line 101 and the output line 102, the router 100 actually has a plurality of input lines 101 and output lines 102.

Figure 3:
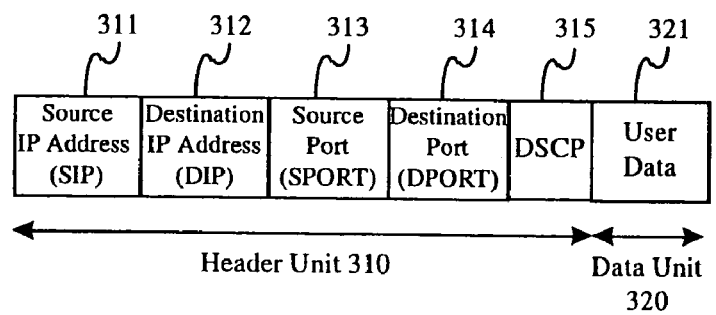
FIG. 3 is a diagram depicting a format of a packet employed in the network.

FIG. 3 shows one example of a format of each packet employed in a network. The packet transferred in the network comprises a header unit 310 and a data unit 320. The header unit 310 comprises a source IP address (hereinafter called SIP) 311 indicative of a source address (address of a transmission terminal), a destination IP address (hereinafter called DIP) 312 indicative of a destination address (address of a receiving terminal), a source port, (hereinafter called SPORT) 313 indicative of a protocol or application program, a destination port (hereinafter called DPORT) 314, and a DSCP 315 indicative of priority within the network. Further, the data unit 320 comprises user data 321 indicative of data for a user. While the header unit 310 also includes information such as protocol information of the other layer higher than IP protocol in except for the above information, processing to be described later can be applied to them in a manner similar to the above information.

FIG. 3 shows a format in a case where a protocol of a transport layer is a TCP (Transmission Control Protocol) or a UDP (User Datagram Protocol), and a protocol of a network layer is an IP (Internet Protocol). However, the other protocols, for example, IPX as a protocol of the network layer or the like may be also applicable.

Figure 4:
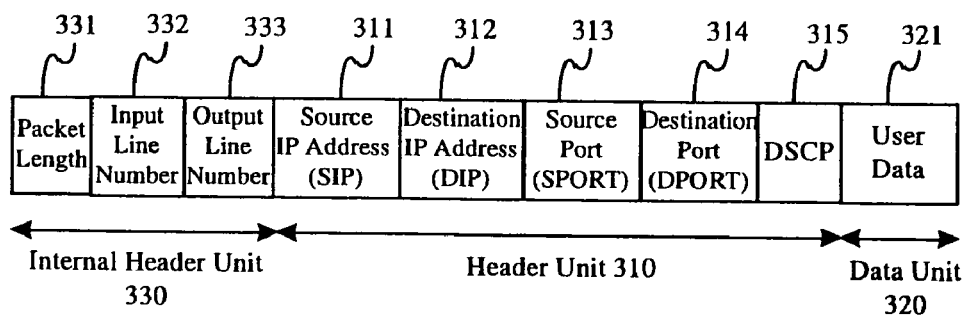
FIG. 4 is a diagram showing a format of a packet processed in the router according to the present invention.

FIG. 4 shows one example of a format of packets in the router 100 according to the present invention. The format of the packet in the router 100 has an internal header unit 330 added to the format of the packets transferred in the network. The internal header unit 330 comprises a packet length 331 indicative of a byte length of the packet, an input line number 332 as an identifier of a line to which the packet is inputted, and an output line number 333 as an identifier of a line for outputting the packet therethrough.

When a packet is inputted from the input line 101, the packet receiving circuit 160 adds the internal header unit 330 to the packet, counts a byte length of the packet, and writes the byte length and an identifier of the input line 101 to which the packet is inputted, into the packet length 331 and the input line number 332, respectively. Then, the packet receiving circuit 160 stores the packet and at the same time transmits packet header information 11 comprised of the internal header unit 330 and the header unit 310 to the header processing unit 140. In this case, the output line number 333 includes a meaningless value.

The bandwidth monitoring unit 141 in the header processing unit 140 determines a DSCP from the packet header information 11 and transmits packet DSCP information 12 comprised of the DSCP to the packet receiving circuit 160. The routing processing unit 142 in the header processing unit 140 determines an output line 102, to which the received packet should be output, based on the DIP 312 included in the packet header information 11 and transmits it to the packet receiving circuit 160 as packet output line information 13.

Upon receiving the packet DSCP information 12 and the packet output line information 13, the packet receiving circuit 160 writes these information into the DSCP 315 and the output line number 333 and transmits the received packets to the buffer selector on receiving side 150. The buffer selector on receiving side 150 determines one of buffers on receiving side 130-i according to the value of the DSCP 315 and transmits the packet to the buffer on receiving side.

Each buffer on receiving side 130-i has a discard threshold 132-i and performs buffer storage control based on the value of the DSCP 315. According to the buffer storage control, when the DSCP of a received packet indicates a priority packet, the received packet is stored in the buffer on receiving side 130-i if the buffer on receiving side 130-i has an empty area, and the received packet is discarded if there is no empty area. When the DSCP indicates a non priority packet, the received packet is stored in the buffer on receiving side 130-i when the amount of packets already stored therein is equal to or less than the discard threshold 132-i, and the received packet is discarded even if the buffer on receiving side 130-I has an empty area when the amount of the packets already stored therein has exceeded the discard threshold 132-i.

The packet transmission circuit on receiving side 120 performs control for reading out the packets stored in the, buffers on receiving side 130-i. As the read-out control, there are known priority queuing, weighted fair queuing, etc. According to the priority queuing, the packets are read out one after another in storing order thereof from the buffer on receiving side 130-i having a high priority as far as packets are stored in the buffer. When no packets are stored in the buffer on receiving side 130-I having a high priority, packets are read out in storing order thereof from one of the other buffers on receiving side 130-i having a low priority. In the weighted fair queuing, packets are read out from each of the buffers on receiving side 130-i according to a predetermined ratio.

In the present invention, QoS of priority packets in the router 100 is achieved by utilizing the buffer storage control and read-out control described above in combination.

The packet forwarding processing means 110 performs switching of packets according to the output line number 333, and the buffer selector on transmission side 151 transmits the packets to their corresponding buffers on transmission side 131-i, based on the value of the DSCP 315. The buffers on transmission side 131-i perform packet storage control similar to the buffers on receiving side 130-i, and the packet transmission circuit on transmission side 121 performs packet read-out control similar to the packet transmission circuit on receiving side 120, thereby ensuring QoS of priority packets. Upon receiving a packet read out from the buffers on transmission side 131-i, the packet transmission circuit 161 deletes the internal header units 330 from the packet and transmits the packet to the output line 102.

Detailed operation of the bandwidth monitoring unit 141 according to the present invention will next be described by referring to FIG. 2 and FIGS. 5 through 7.

A network configuration supposed by the present invention will first be explained using FIG. 2.

Figure 2:
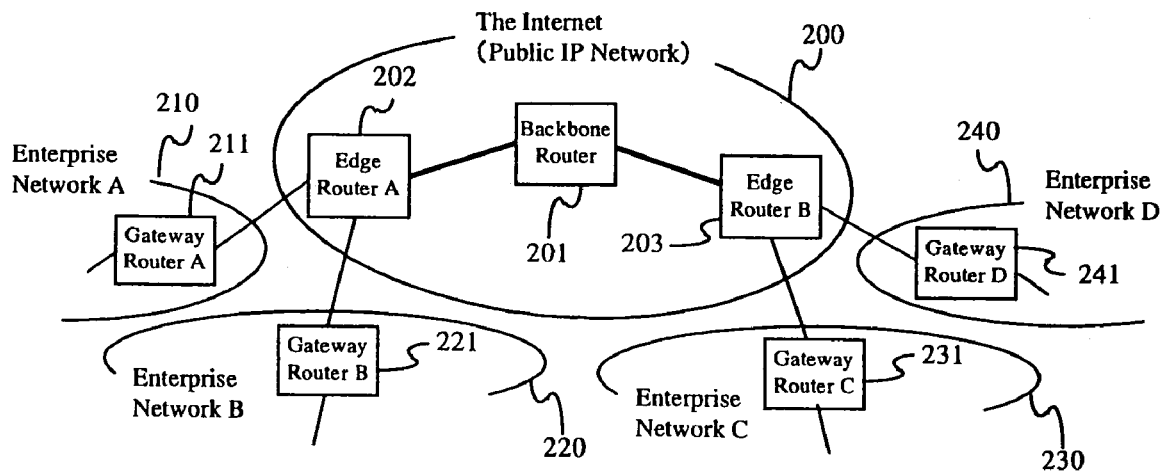
FIG. 2 is a constitutional diagram of an Internet.

FIG. 2 shows a network wherein enterprise networks A:210, B:220, C:230 and D:240 are connected to one another by an Internet 200. The Internet 200 comprises edge routers A:202 and B:203 located at edges of the network, and a backbone router 201 located at a core thereof. Gateway routers A:211, B:221, C:231 and D:241 are placed in gateways to the Internet 200 within the enterprise networks A:210, B:220, C:230 and D:240.

The router 100 of the present invention shown in FIG. 1 is used as the edge router A202 for checking or monitoring a bandwidth of priority packets contracted between the Internet 200 and the enterprise network A: 210. The gateway router A: 211 of the enterprise network A: 210 has a boundary marking case in which packets are transmitted without making a distinction between priority and non priority destinations, and a customer marking case in which packets are transmitted distinguishing between priority and non priority destinations.

The boundary marking case will first be explained. Incidentally, the bandwidth monitoring unit 141 preferentially judges voice packets as priority packets in the present embodiment.

As an algorithm for monitoring a bandwidth, such a modified algorithm is used that a Leaky Bucket Algorithm for monitoring a bandwidth of fixed-length packets is expanded in order to monitor a bandwidth of variable length packets. The Leaky Bucket Algorithm has been described in, for example, Chapter 4.4.2 of The ATM Forum Specification version 4.0.

The Leaky Bucket Algorithm is a model of certain depth of leakage bucket with a hole. While the bucket is storing water therein, water leaks at a predetermined rate corresponding to a monitoring bandwidth, and a fixed amount or level of water corresponding to one cell is poured into the bucket upon arrival of each cell. The bucket has a depth for the purpose of allowing fluctuations of cell arrival. When the water is not overflowing the bucket, input cells are judged to comply with a contract bandwidth. If the water overflows the bucket, input cells are judged to violate the contract bandwidth. In the invention of the present application, the monitoring of the bandwidth for variable length packets is achieved by varying the amount of water to be poured into the bucket depending upon a arrival packet.

Figure 5:
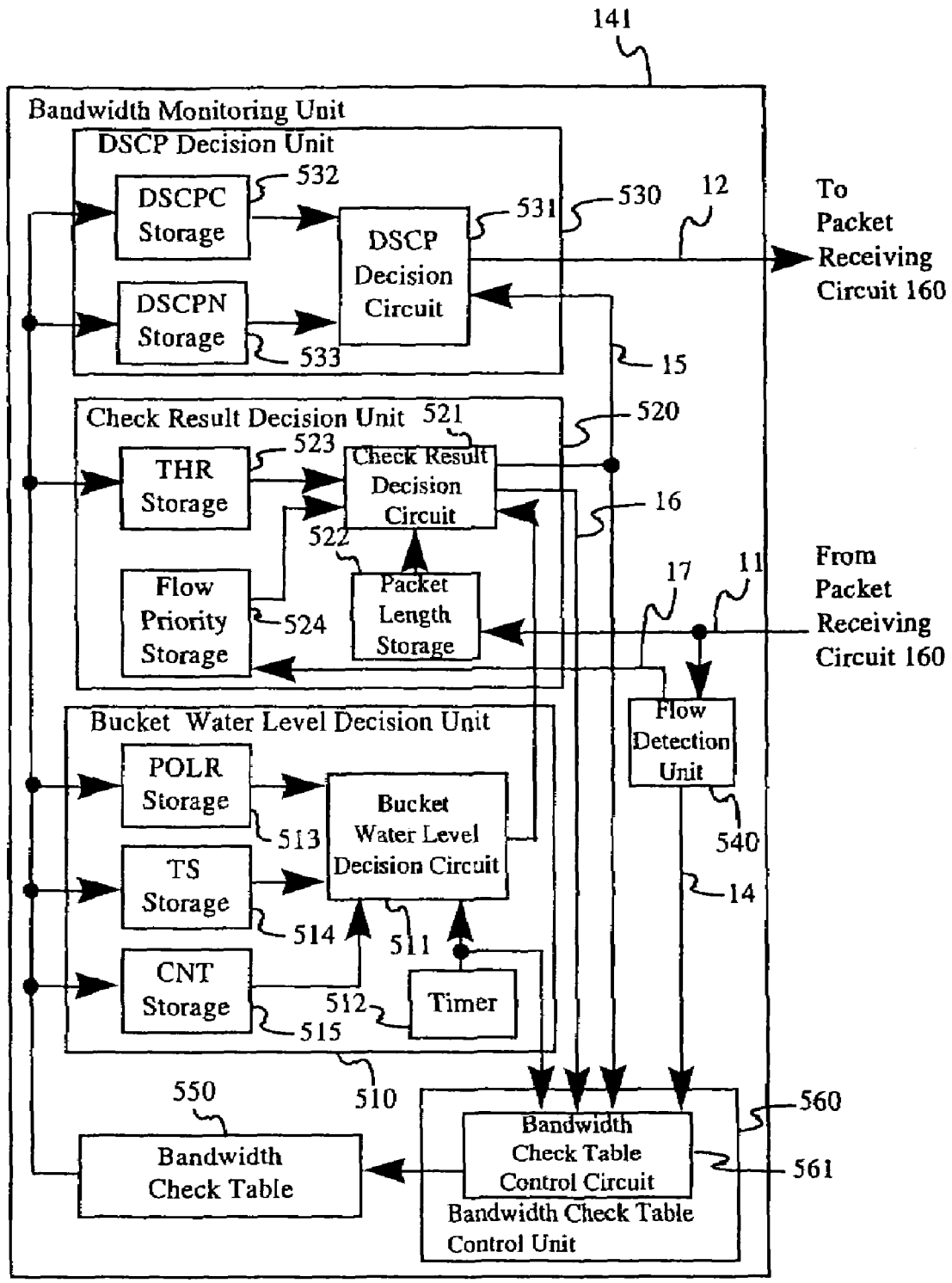
FIG. 5 is a block diagram illustrating a configuration of a bandwidth check unit 141 according to the present invention.

A block diagram of the bandwidth monitoring unit 141 is shown in FIG. 5. The bandwidth monitoring unit 141 comprises a bandwidth check table control unit 560, a bucket water level decision unit 510, a check result decision unit 520, a DSCP decision unit 530, a flow detection unit 540, and a bandwidth check table 550.

The flow detection unit 540 is a functional part inherent in a router. In an ATM switch, a connection is established in advance, and bandwidth monitoring control information is read out according to a connection identifier of each input cell. Further, the bandwidth monitoring unit executes bandwidth monitoring through the use of the bandwidth monitoring control information (connection communication). On the other hand, since no connection is established in advance in a router device, the router device needs to have flow detecting means for determining a flow identifier used as an alternative to the connection identifier for each input packet according to information or the like lying within a header with a view toward performing the bandwidth monitoring by the router device (connectionless communication). The router reads out bandwidth monitoring control information corresponding to the flow identifier and executes the bandwidth monitoring by using the bandwidth monitoring control information.

Incidentally, in the specification of the present application, a packet identifying condition created by utilizing information such as in-header information or the like in combination will be referred to as flow condition, a series of traffics coincident with the flow condition will be called flow, and a decision as to whether each input packet coincides with the flow condition, will be called flow detection, respectively.

Figure 6:
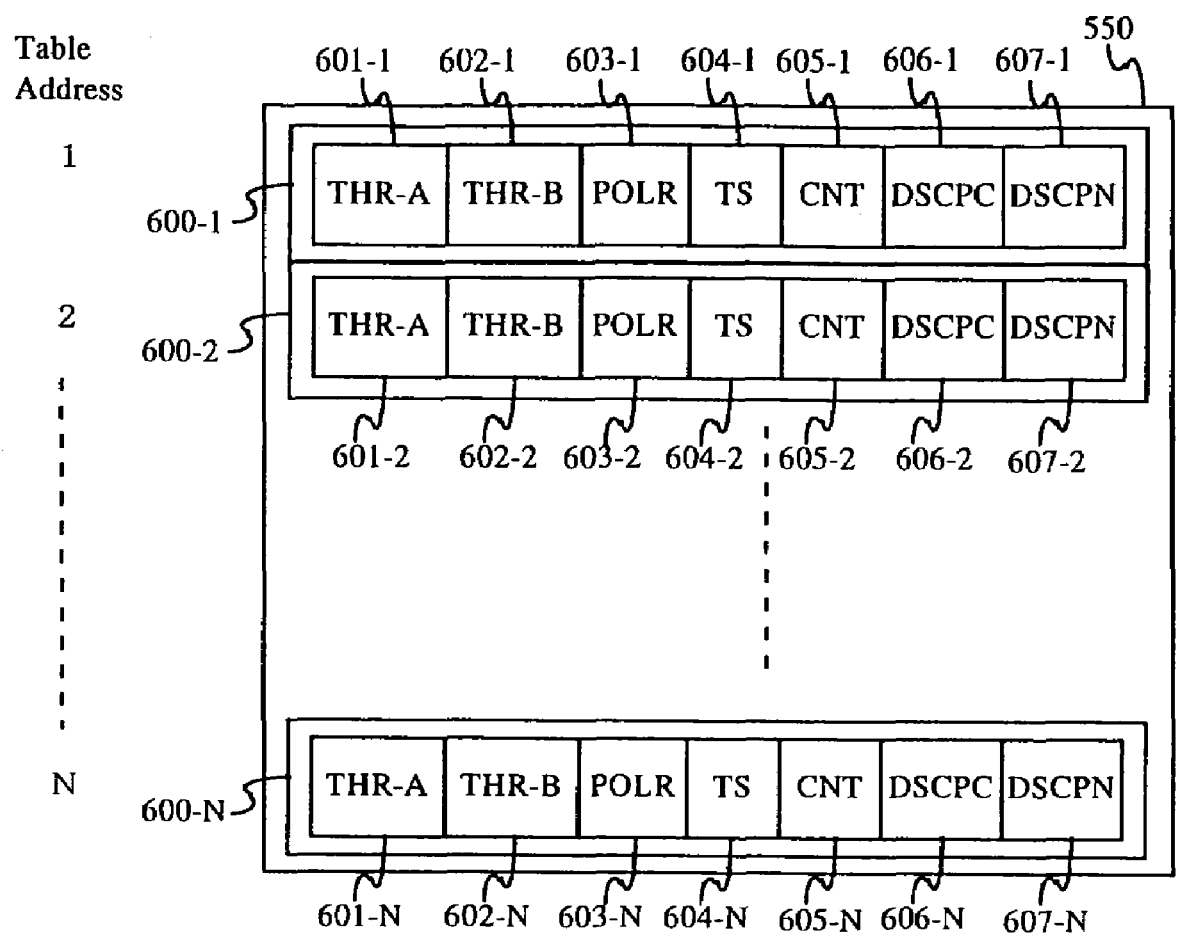
FIG. 6 is a diagram depicting a format of a bandwidth check table 550.

FIG. 6 shows a format of the bandwidth check table 550.

The bandwidth monitoring or check table 550 has N bandwidth check information entries 600-1 to 600-N. The bandwidth monitoring unit 141 effects bandwidth monitoring on one or more flows which share the use of a bandwidth, according to one of bandwidth check control information entries 600-j (where j=1 to N). In the present embodiment, a flow of voice packets sent by the enterprise network A210 and a flow of packets other than the voice packets are monitored at a contract bandwidth according to one of said bandwidth check control information entries 600-j.

Each of bandwidth check control information entries 600-j comprises a threshold-A (THR-A) 601-j (Byte) indicative of a depth of bucket for packets to which a flow priority to be described later is given as priority, a threshold-B (THR-B) 602-j (Byte) indicative of a depth of bucket for packets with non priority, a policing rate (POLR) 603-j (Byte/sec) indicative of a leakage rate of a bucket, i.e., a monitoring or check rate, a time stamp (TS) 604-j (sec) indicative of the previous arrival time of a packet which refers to the same bandwidth check control information entry 600-j, a count (CNT) 605-j (Byte) indicative of the amount or level of water stored in the bucket immediately after the bandwidth monitoring of the previous packet, a DSCP conformance (DSCPC) 606-j indicative of a DSCP of a packet judged as conformance by the bandwidth monitoring and transferred as a priority packet, and a DSCP non-conformance (DSCPN) 607-j indicative of a DSCP of a packet judged as non-conformance and transferred as a non priority packet. Incidentally, the THR-A 601-j and THR-B 602-j each indicative of the depth of the bucket satisfy the relations in THR-A 601-j ≧ THR-B 602-j.

Figure 7:
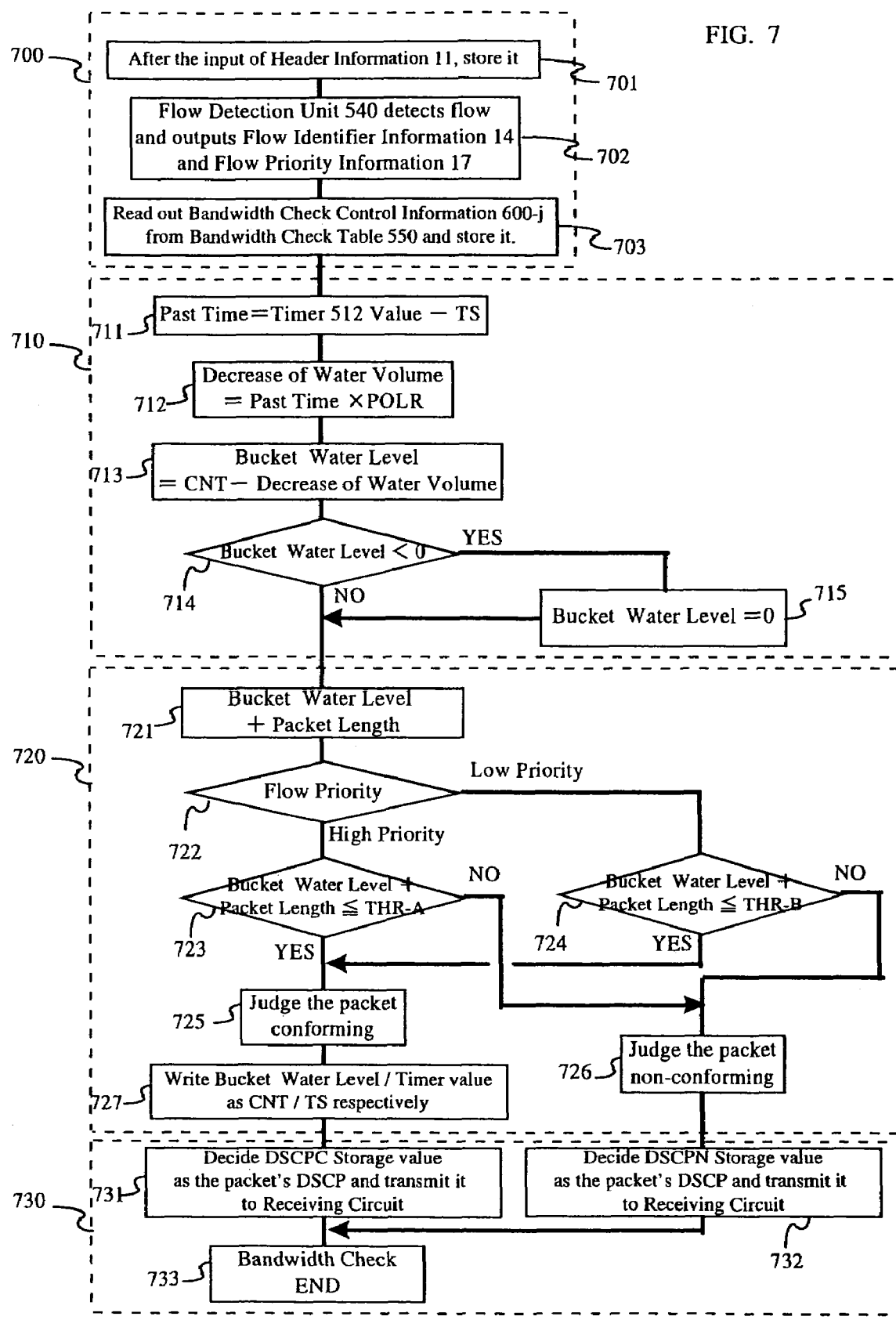
FIG. 7 is a flowchart of the bandwidth check unit 141 to which the present invention is applied.

FIG. 7 shows a flowchart of the bandwidth monitoring unit 141.

Processing performed in the bandwidth monitoring unit 141 comprises bandwidth check start processing 700, bucket water level decision processing 710, check result decision processing 720, and DSCP decision processing 730. The later three kinds of processing are principally executed by the bucket water level decision unit 510, check result decision unit 520 and DSCP decision unit 530 respectively.

When the bandwidth monitoring unit 141 receives packet header information 11, a packet length storage 522 of the check result decision unit 520 stores a packet length 331 therein, and the flow detection unit 540 stores a SIP 311, a DIP 312, a SPORT 313 and a DPORT 314 therein (Step 701). In Step 702, the flow detection unit 540 performs flow detection based on the stored information and judges or determines a flow identifier corresponding to an identifier of a flow for each input packet, and a flow priority which indicates the priority of packets within the flow. Thus, the flow detection unit 540 transmits flow identifier information 14 comprised of the flow identifier to the bandwidth check table control circuit 561 of the bandwidth check table control unit 560 and transmits flow priority information 17 comprised of the flow priority to a flow priority storage 524 of the check result decision unit 520. In the present embodiment, the flow priority of voice packet is defined as priority and the flow priority of the other packets are defined as non priority so that voice packets are preferentially judged as the priority packets.

Upon receiving the flow identifier information 14, the bandwidth check table control circuit 561 creates an address for accessing the bandwidth check table 550 based on the flow identifier information 14 to thereby read out bandwidth check control information 600-j. Thereafter, THR-A: 601-j and THR-B: 602-j are transferred to a THR storage 523 of the check result decision unit 520, and POLR 603-j, TS 604-j and CNT 605-j are transferred to a POLR storage 513, a TS storage 514 and a CNT storage 515 of the bucket water level decision unit 510. Then DSCPC 606-j and DSCPN 607-j are transferred to a DSCPC storage 532 and a DSCPN storage 533 of the DSCP decision unit 530, respectively (Step 703).

In the bucket water level decision processing 710, the bucket water level decision unit 510 determines the level of water in a bucket (bucket water level) immediately preceding the input of each packet. A bucket water level decision circuit 511 first calculates the difference between the value of a timer 512 for counting the present time and TS 604-j (sec) in the TS storage 514 which indicates the arrival time of the previous packet to obtain a time which has elapsed since the arrival of the previous packet (Step 711). Next, the bucket water level decision circuit 511 calculates the level of water (reduced water level of bucket) which has leaked from the arrival of the previous packet (Step 712) by multiplying the elapsed time (sec) by the POLR 603-j (Byte/sec) in the POLR storage 513. Further, the bucket water level decision circuit 511 subtracts the reduced water level of the bucket from the CNT 605-j in the CNT storage 515 which indicates a bucket water level immediately after the bandwidth monitoring of the previous packet, thereby to determine a bucket water level immediately preceding the input of a packet (Step 713). The bucket water level decision unit 510 determines whether the value of the bucket water level is positive or negative (Step 714). If the value is negative, the bucket water level decision unit 510 corrects the bucket water level to "0" which means that the bucket is empty (Step 715).

In the check result decision processing 720, a check result decision circuit 521 of the check result decision unit 520 determines whether water equivalent to a packet length of the input packet can be poured into the bucket. Firstly, a packet length (Byte) is added to the bucket water level (Byte) determined according to the bucket water level decision processing 710 (Step 721). Next, the flow priority information 17 transmitted by the flow detection unit 540 is stored in the flow priority storage 524. Then succeeding processing is determined depending upon the stored information (Step 722). When the stored information is judged as priority, the depth of the bucket for the priority packet THR-A 601-j stored in the THR storage 523 and the above added value are compared (Step 723). If the added value (bucket water level+packet length) is larger than the value of THR-A 601-j, i.e., it is estimated that the water must overflow the bucket when additional water equivalent to the packet length is poured, the check result decision circuit 521 judges the input packet as a violation packet and transmits bandwidth check result information 15 indicative of violation to the DSCP decision circuit 531 of the DSCP decision unit 530 and the bandwidth check table control circuit 561 of the bandwidth check table control unit 560 (Step 726). On the other hand, if the added value (bucket water level+packet length) is equal to or smaller than the value of THR-A 601-j, the check result decision circuit 521 judges that the input packet as a conformance packet and transmits bandwidth check result information 15 indicative of conformance to the DSCP decision circuit 531 and the bandwidth check table control circuit 561 and transmits the added value (bucket water level+packet length) to the bandwidth check table control circuit 561 as a bucket water level information 16 (Step 725).

When the result of reference in Step 722 is judged as non priority, the added value (bucket water level+packet length) and the depth of a bucket THR-B 602-j for the non priority packets stored in the THR storage 523 are compared (Step 724). If the added value (bucket water level+packet length) is larger than the value of THR-B 602-j, Step 726 referred to above is executed. Otherwise (bucket water level+packet length≦THR-B 602-j), Step 725 referred to above is executed.

Steps 722 and 724 are processed inherent in the present invention. When the enterprise network A210 is transmitting voice packets at a rate within the contract bandwidth, since no overflow occurs as far as the amount of water poured in the bucket corresponds to the voice packets only, some amount of packets other than the voice packets may be transferred using the remain of the contract bandwidth by judging them as conformance. On the other hand, when a user is transmitting voice packets at a rate greater than the contract bandwidth, the bucket always stores water over the threshold level THR-B 602-j. Therefore, in this case, only the voice packets are judged as conformance.

Upon receiving bandwidth check result information 15 indicative of conformance, the bandwidth check table control circuit 561 writes bucket water level information 16 and a count or value of the timer 512 into their corresponding CNT 605-j and TS 604-j as a bucket water level and an arrival time of the packet at the instant of the bandwidth monitoring (Step 727). The bandwidth check table control circuit 561 does not execute Step 727 referred to above when bandwidth check result information 15 indicative of violation is received.

In the DSCP decision processing 730, the DSCP decision unit 530 determines a DSCP, based on the bandwidth check result information 15. When the bandwidth check result information 15 is judged as conformance, the DSCP decision circuit 531 judges the DSCP stored in the DSCPC storage 532 as a DSCP of the input packet and transmits packet DSCP information 12 comprised of the DSCP to the packet receiving circuit 160 (Step 731). When the bandwidth check result information 15 is judged as violation, the DSCP decision circuit 531 judges the DSCP stored in the DSCPN storage 533 as a DSCP of the input packet and transmits packet DSCP information 12 comprised of the DSCP to the packet receiving circuit 160 (Step 732).

Figure 8:
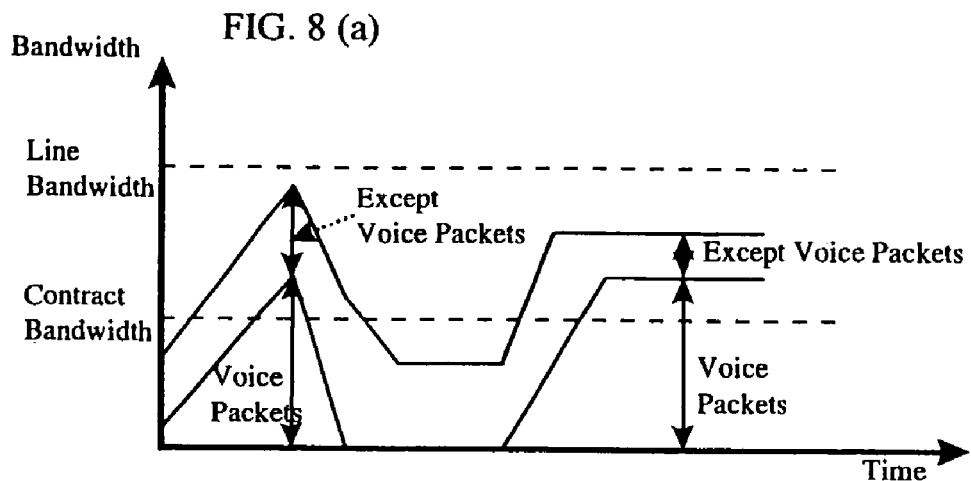
FIG. 8(*a*) is a diagram showing the variation with the passage of time in traffics of voice packets and the other packets transmitted from an enterprise network A210.
Figure 8B:
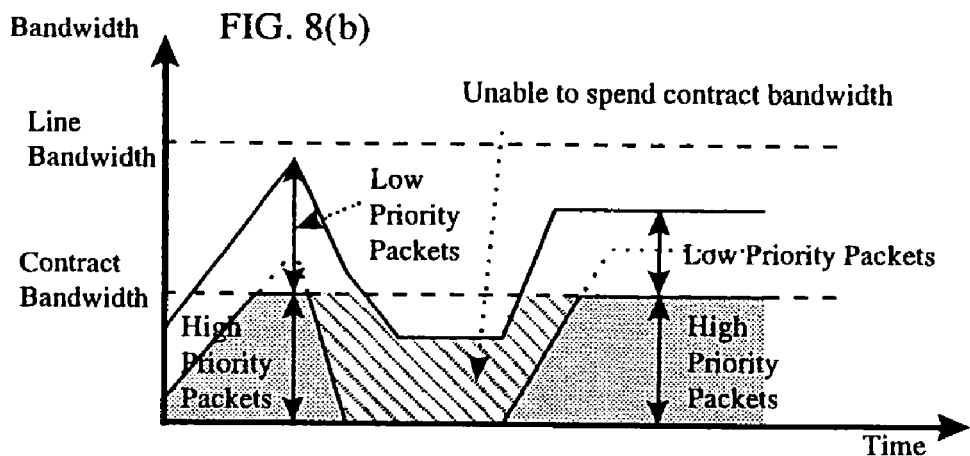

The bandwidth monitoring device having the bandwidth monitoring function, according to the prior art 1, determines voice packets within a monitoring bandwidth. (contract bandwidth) as priority packets while judging surplus voice packets over the monitoring bandwidth and packets other than the voice packets as non priority packets. When the traffics shown in FIG. 8(a) are inputted, the traffics observed after the prior art bandwidth monitoring are represented as shown in FIG. 8(b). Packets other than voice packets indicated by diagonally-shaded portions shown in FIG. 8(b) are transmitted as non priority packets regardless of the fact that the real amount of priority packets stays within the monitoring bandwidth. Namely, a manager of the enterprise network A210 is not able to sufficiently utilize the contract bandwidth for the priority packets.

Figure 8C:
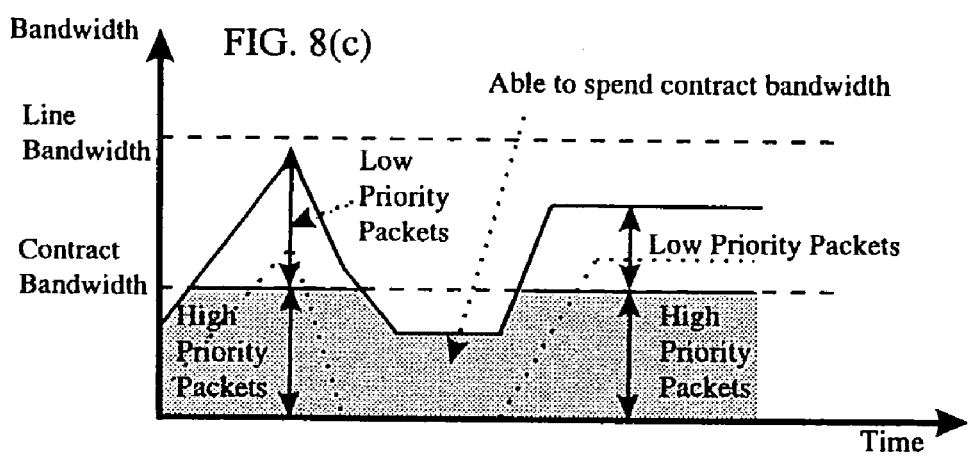

Since the bandwidth monitoring unit 141 according to the present invention is newly provided with a threshold THR-B 602-j, it is able to judge some amount of packets other than voice packets as priority packets when the bandwidth of the received voice packets is below the contract bandwidth and the bucket water level is less than the THR-B 602-j. Traffics observed after passing through the bandwidth monitoring by the bandwidth monitoring unit 141 of the present invention are shown in FIG. 8(c), which indicates that the manager of the enterprise network A210 can sufficiently utilize the contract bandwidth.

The above-described embodiment has described a case in which the gateway router A211 transmits two types of packets (voice packets and the other packets) different in flow priority. A description will next be made of a case in which four types of packets different in flow priority are transmitted.

In the following embodiment, the gateway router A: 211 transmits four types of packets different in flow priority, such as packets of voice, transaction data, E-mail, and others. Incidentally, for example, priorities are given in order of voice>transaction data>E-mail>others.

Figure 9:
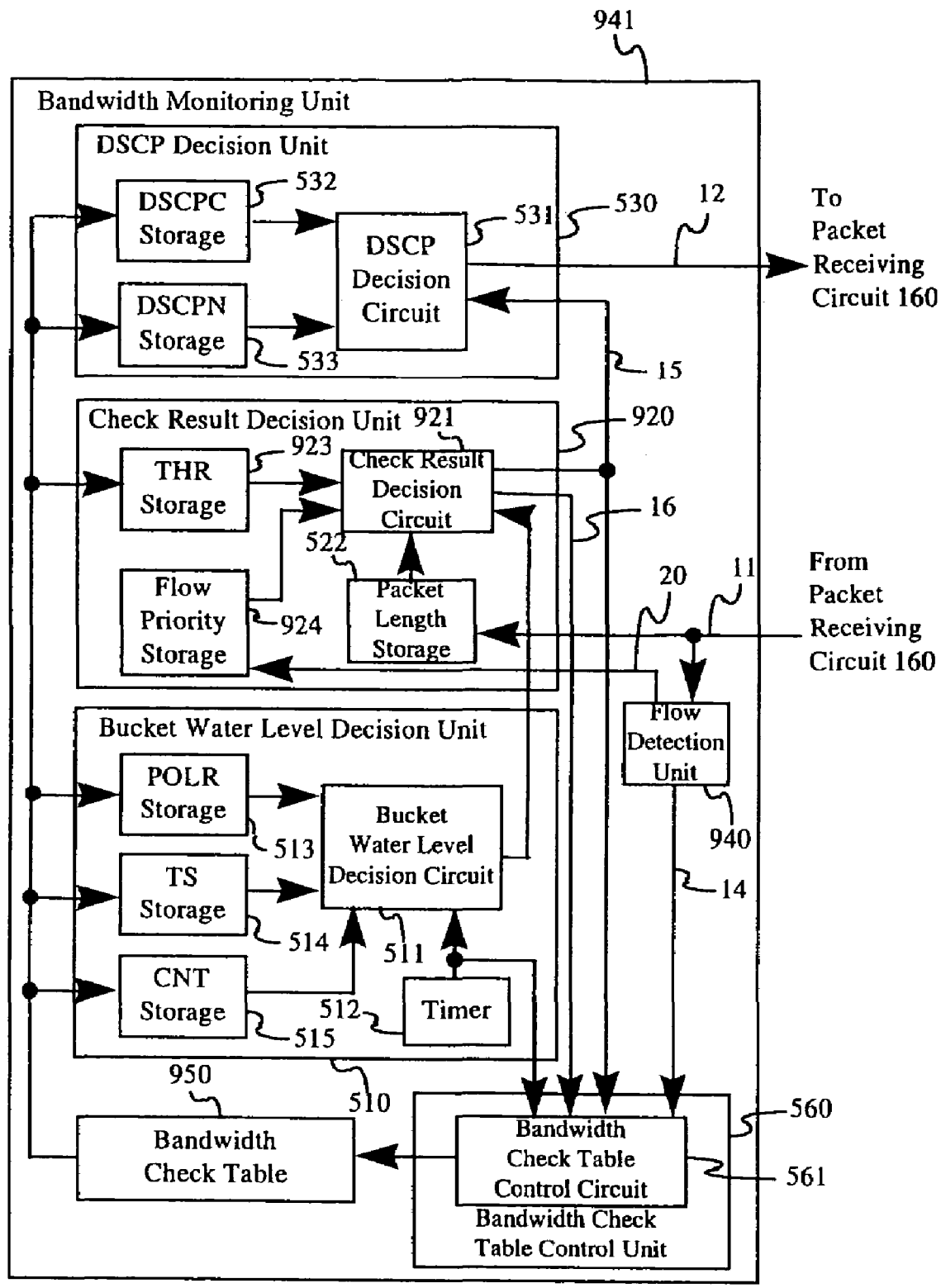
FIG. 9 is a block diagram showing a configuration of a bandwidth check unit 941 to which the present invention is applied.
Figure 10:
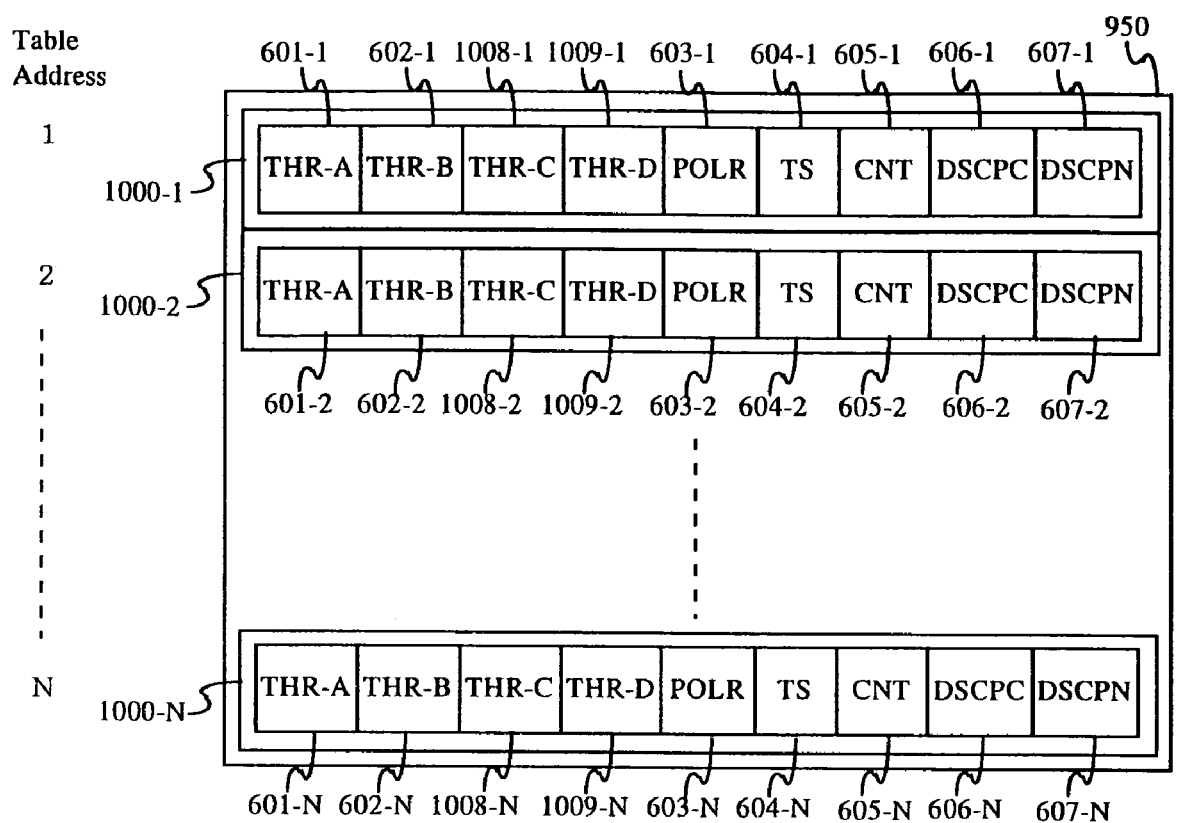
FIG. 10 is a diagram illustrating a format of a bandwidth check table 950.
Figure 11:
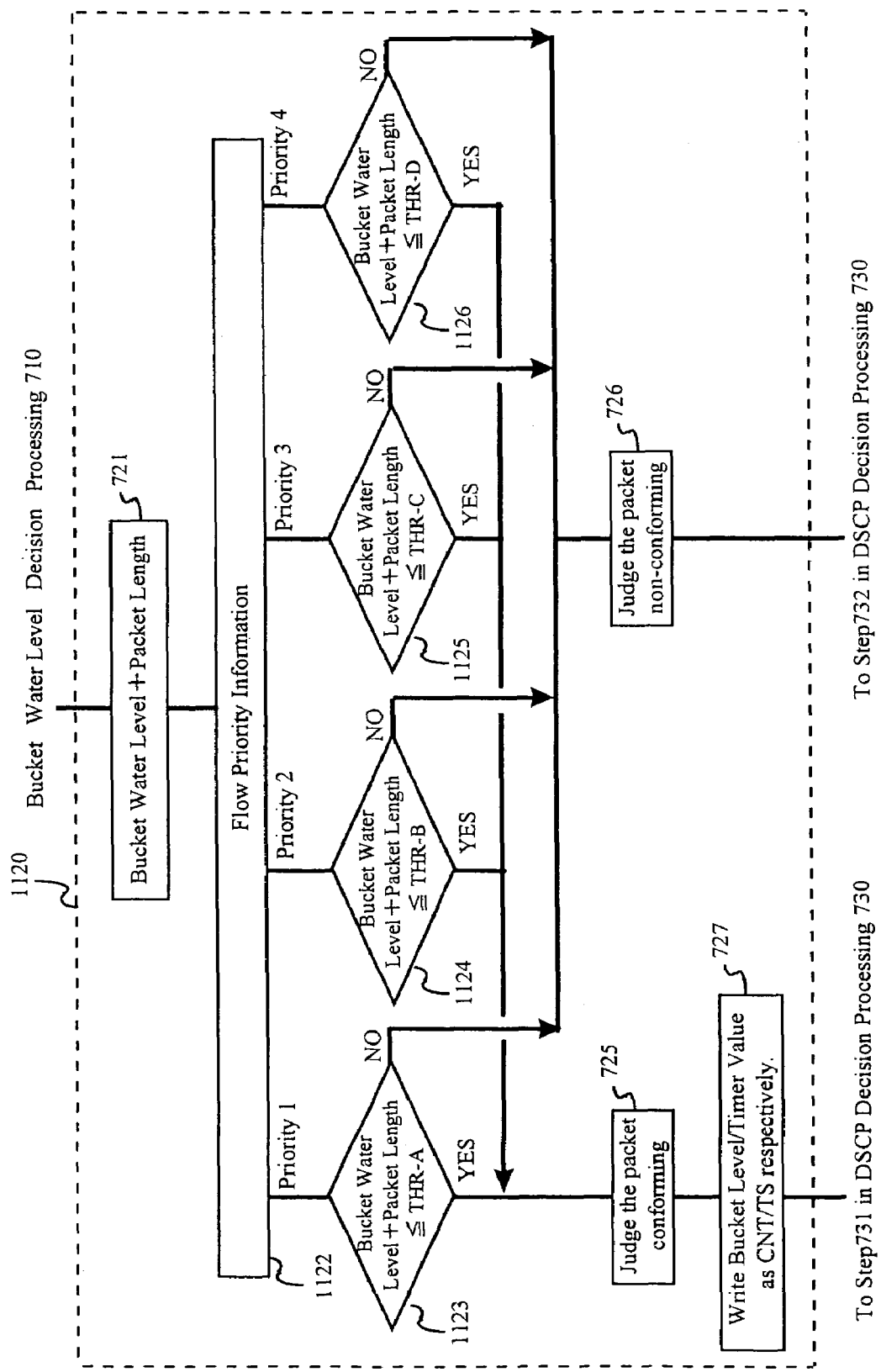
FIG. 11 is a flowchart of a check result decision unit 920 to which the present invention is applied.

FIG. 9 is a block diagram of a bandwidth monitoring unit 941, FIG. 10 shows a format of a bandwidth check table 950, and FIG. 11 is a flowchart of check result decision processing 1120, respectively. A description will be made of the difference between the transmission of the four types of packets and the transmission of the two types of packets.

As compared with the bandwidth check table 550, the bandwidth check table 950 is newly provided with THR-C 1008-j (where j=1 to N) and THR-D 1009-j. Incidentally, there is a relation of THR-A 601-j≧THR-B 602-j≧THR-C 1008-j≧THR-D 1009-j.

When the flow priority of packets are classified into four types, a flow detection unit 940 applies Step 1102 for determining a flow identifier and flow priorities (priority 1 to priority 4), transmitting flow identifier information 14 comprised of the flow identifier to a bandwidth check table control circuit 561 of a bandwidth check table control unit 560, and transmitting flow priority information 20 including one of said four flow priorities to a flow priority storage 924 in place of Step 702. Further, Step 703 is replaced by Step 1103 for storing even THR-C 1008-j, THR-D 1009-j in a THR storage 923 in addition to the THR-A 601-j and THR-B 602-j.

Steps 722 through 724 of the check result decision processing 720 are respectively replaced by Steps 1122 through 1126 of check result decision processing 1120 shown in FIG. 11. In Step 1122, the flow priority storage 940 stores therein the flow priority information 20 transmitted by the flow detection unit 940, and processing operation is divided into four branches depending upon the stored information. When the stored information are respectively given as priority 1, priority 2, priority 3, and priority 4, THR-A 601-j, THR-B 602-j, THR-C 1008-j, and THR-D 1009-j are respectively compared in magnitude with added value of the bucket water level and packet length calculated in Step 721, and a decision as to either conformance or violation is made (Steps 1123 through 1126).

Figure 12:
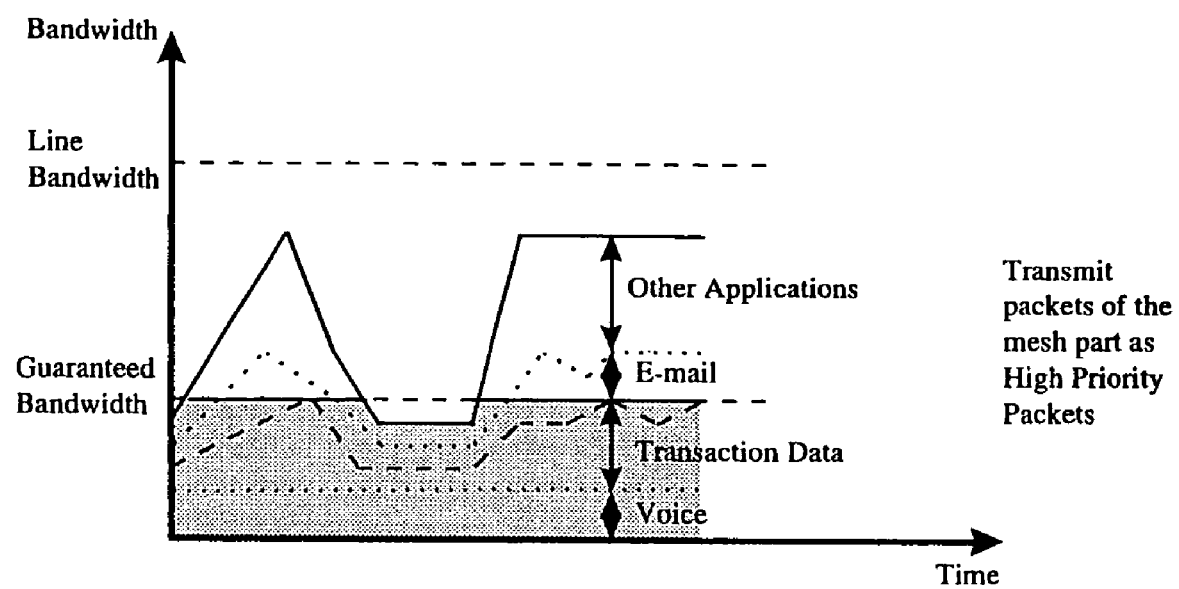
FIG. 12 is a diagram showing the variation with the passage of time in traffics after passing through the router having the bandwidth monitoring unit 141 to which the present invention is applied in a case where four types of traffics are sent out from the enterprise network A210.

When the gateway router A: 211 transmits the four types of packets different in flow priority as described above, these packets can be packed into the contract bandwidth in order from the packets high in flow priority as shown in FIG. 12 owing to the bearing of four bucket's depths by the edge router A: 202. Similarly, when the gateway router A: 211 transmits H (>2) types of packets different in flow priority, these packets can be packed into the contract bandwidth in order from the packets high in flow priority owing to the bearing of H pieces of bucket's depths by the edge router A:202.

A description has been made so far of the operations of the bandwidth monitoring unit 141 and the bandwidth monitoring unit 941 in the boundary marking case in which the enterprise network A: 210 transmits the packets without drawing the distinction between the priorities. A description will next be made of the operation of the bandwidth monitoring unit 141 in the customer marking case in which the enterprise network A: 210 transmits the packets while distinguishing between the priorities thereof.

Figure 13:
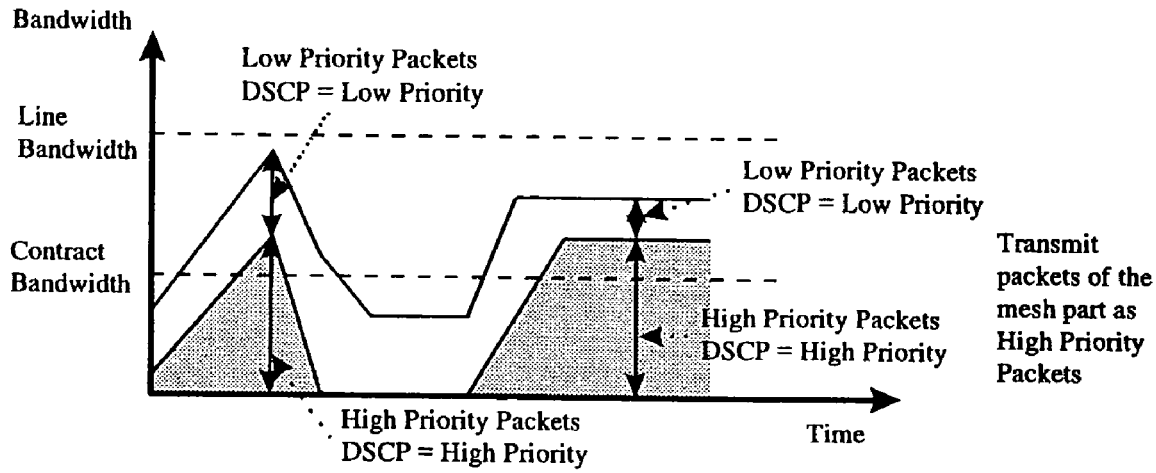
FIG. 13(*a*) is a diagram showing the variation with the passage of time in traffics of priority packets and non priority packets transmitted from the enterprise network A210.

In FIG. 2, it is assumed that the bandwidth for the priority packets is contracted between the Internet 200 and the enterprise network A: 210, and the gateway router A: 211 transmits priority packets and non priority packets in distinction from one another according to DSCP as shown in FIG. 13(a). The edge router A: 202 performs bandwidth monitoring to carry out an re-assignment of the DSCP. A router 100 having the bandwidth monitoring unit 141 to which the present invention is applied, is used as the edge router A: 202.

In the boundary marking case, when the bandwidth monitoring unit 141 receives the packet header information 11 in Step 701, the flow detection unit 540 has stored the SIP 311, DIP 312, SPORT 313 and DPORT 314 therein. In the customer marking case, on the other hand, the DSCP 315 included in the header unit 310 is also stored in addition to the above information and used for flow detection. Operation other than these is identical to the operation of the bandwidth check unit 141 in the boundary marking case.

Figure 13B:
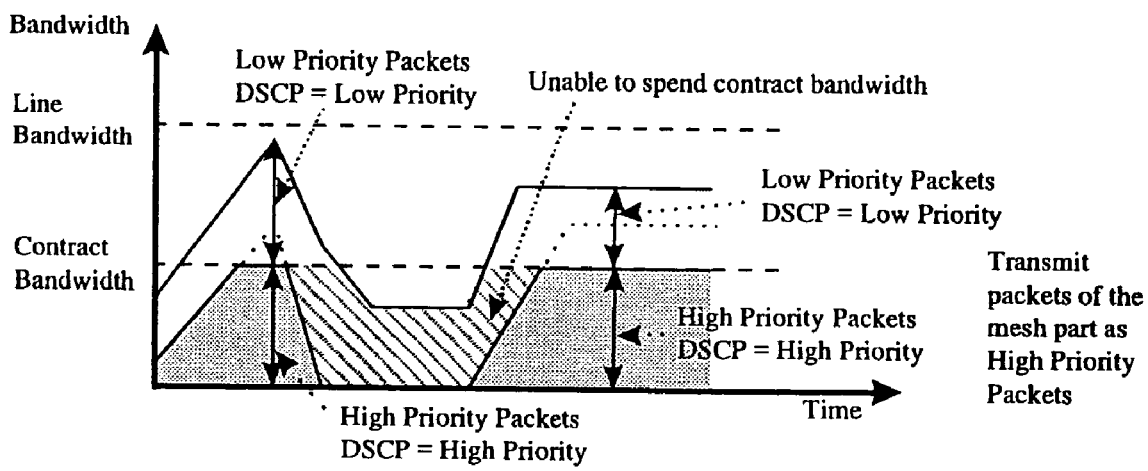
FIG. 13(b) is a diagram showing the variation with the passage of time in traffics after passing through a bandwidth monitoring unit to which the prior art 2 is applied.
Figure 13:
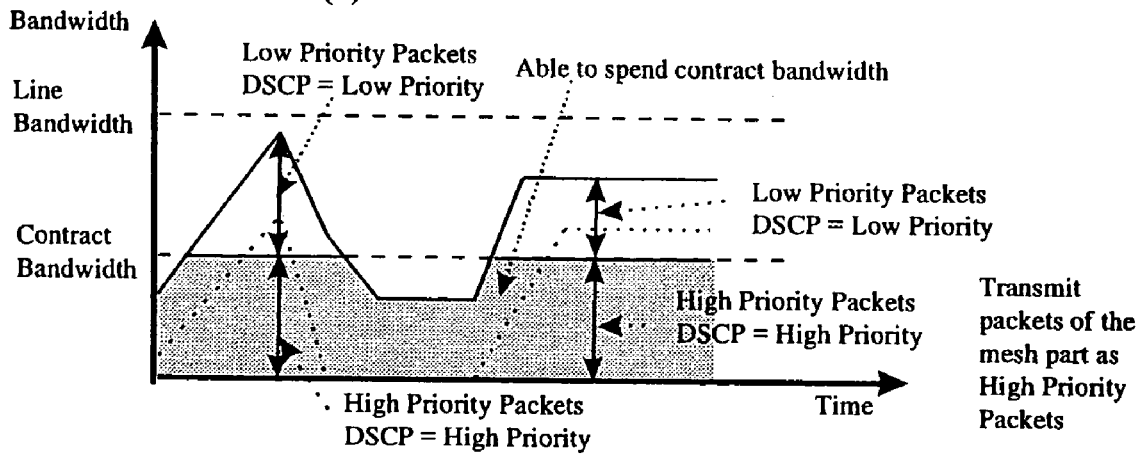

Since the DSCP of each non priority packet is not changed in the prior art 2 even when the gateway router A: 211 does not transmit the priority packets, the manager of the enterprise network A: 210 could not effectively utilize the contract bandwidth (see FIG. 13(b)). On the other hand, when the router 100 provided with the bandwidth monitoring unit 141 according to the present invention is used as the edge router A: 202, the manager of the enterprise network A: 210 can effectively utilize the contract bandwidth owing to a rise in priority of the DSCP of the non priority packets when the gateway router A: 211 transmits priority packets at a rate less than the contract bandwidth (see FIG. 13(c)).

Figure 14:
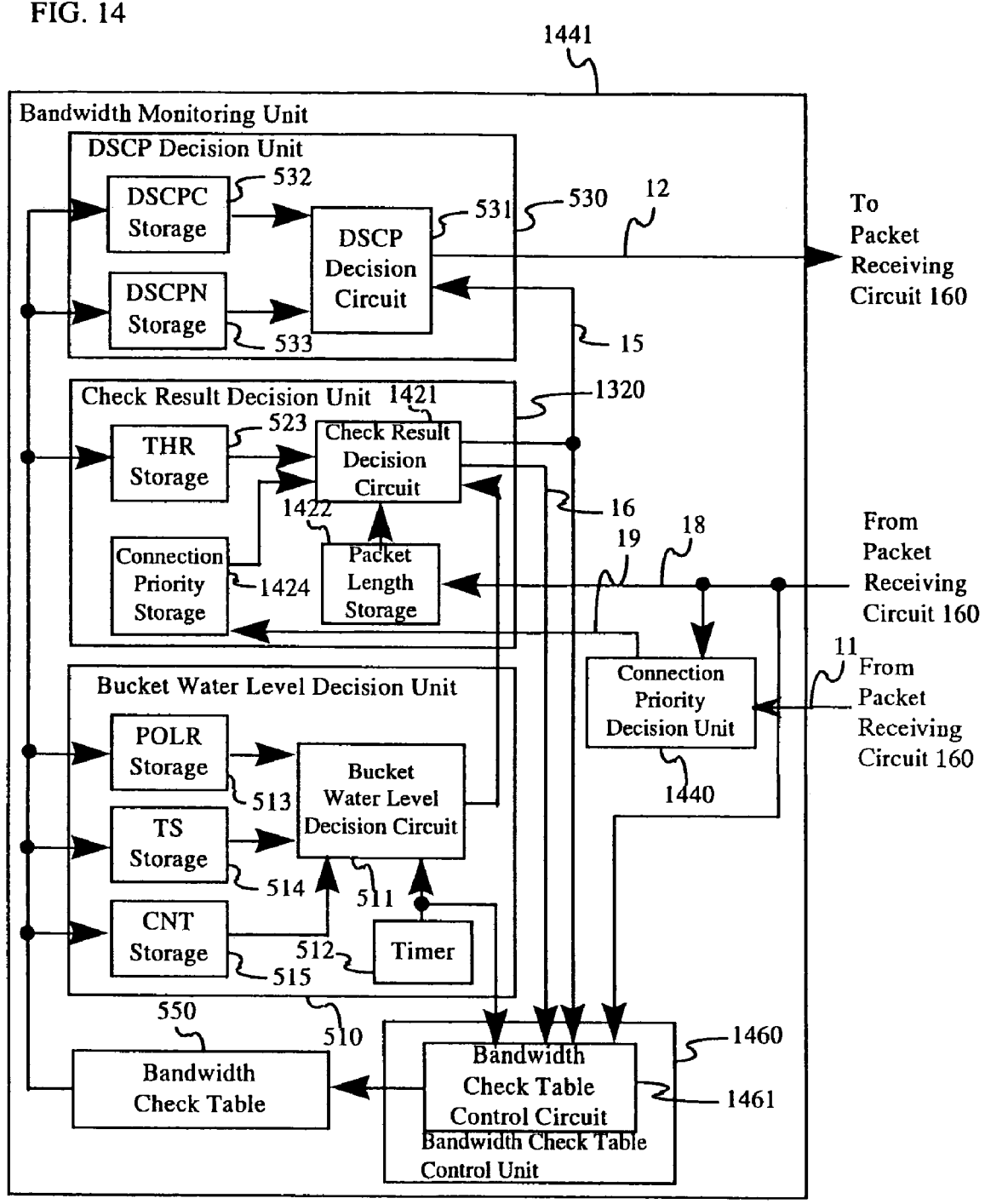
FIG. 14 is a block diagram illustrating a configuration of a bandwidth check unit 1441 to which the present invention is applied.

The embodiments illustrated up to now have described the bandwidth monitoring of the connectionless communication. A block diagram of a bandwidth monitoring unit 1441 employed in a connection communication, such as an ATM and a frame relay, is shown in FIG. 14.

In the bandwidth monitoring unit 1441, the flow detection unit 540 shown in FIG. 9 is replaced by a connection priority decision unit 1440. The connection priority decision unit 1440 determines a connection priority which indicate the priority of packets within a connection, based on a connection identifier within connection identifier information 18 and packet header information 11 and transmits the connection priority to a connection priority storage 1424 as connection priority information 19.

A bandwidth check table control circuit 1461 generates the address of one of entries in a bandwidth check table 550 based on the connection identifier used in place of the flow identifier to read out a bandwidth monitoring control information entry 600-j. Further, a check result decision circuit 1421 judges the conformance or violation of the packet, based on the connection priority stored in the connection priority storage 1424. The other processing other than the above processing are identical to the operation of the bandwidth monitoring unit 141 employed in the connection communication.

Figure 15A:
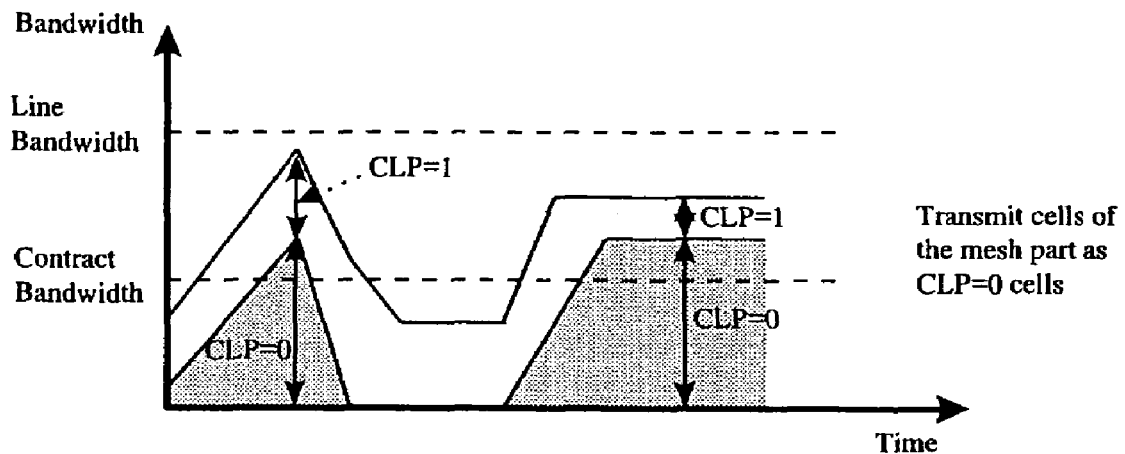
FIG. 15(a) is a diagram showing the variation with the passage of time in traffics of CLP=0 and CLP=1 transmitted from the enterprise network A210.
Figure 15B:
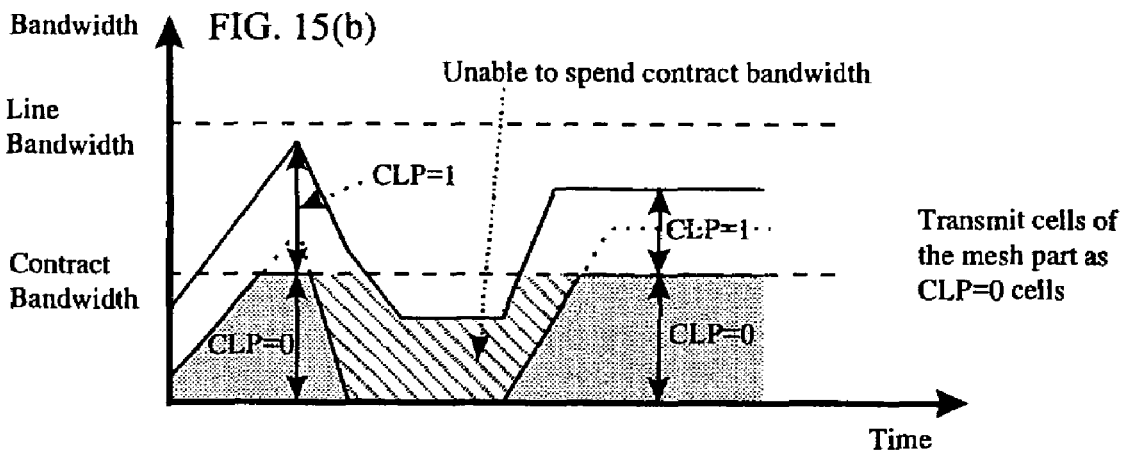
FIG. 15(b) is a diagram showing the variation with the passage of time in traffics after passing through a bandwidth monitoring unit to which the prior art 2 is applied.
Figure 15C:
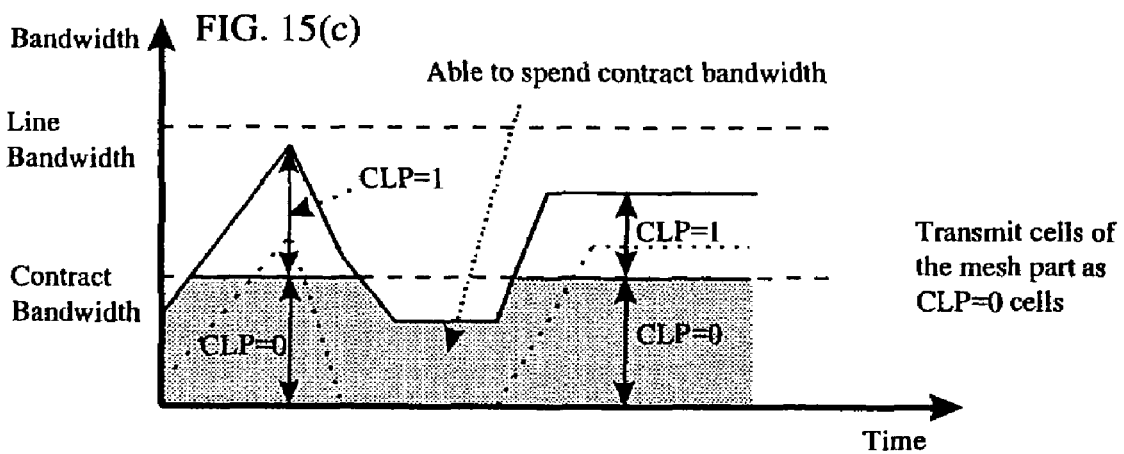
FIG. 15(c) is a diagram showing the variation with the passage of time in traffics after passing through a bandwidth monitoring unit to which the present invention is applied.

Although the priority of the network has been described while being limited to the DSCP of the IP header, a CLP (Cell Loss Priority) bit lying within a header of ATM cell and a DE (Delete Enable) bit lying within a frame header of a frame relay can be also treated in a manner similar to the DSCP. Traffics in a customer marking case in which the gateway router A: 211 effects marking on the CLP of the ATM cells are shown in FIG. 15(a), traffics after the bandwidth monitoring according to the prior art 2 are shown in FIG. 15(b), and traffics after passing through the edge router A: 202 to which the present invention is applied are shown in FIG. 15(c).

According to the prior art 2, since the CLP of an ATM cell with CLP=1 remains unchanged even when the gateway router A: 211 transmits ATM cells with CLP=0 at a rate less than the contract bandwidth, the manager of the enterprise network A: 210 cannot effectively utilize the contract bandwidth. On the other hand, when the router 100 armed with the bandwidth monitoring unit 141 according to the present invention is used as the edge router A: 202, the manager of the enterprise network A: 210 can effectively utilize the contract bandwidth because some amount of ATM cells with CLP=1 are changed to ATM cells with CLP=0 as far as the gateway router A: 211 transmits ATM cells with CLP=0 at a rate less than the contract bandwidth According to the present invention, in a network for preferentially transferring priority packets each having a packet header in which a priority field is given as priority as compared with non priority packets other than the priority packets, wherein a network operator of the network makes a contract for a bandwidth of priority packets with a network user utilizing the network, and the bandwidth of the priority packets are monitored by a node at the entrance of the network, the following advantages are available.

When the amount of priority packets transmitted from the network user by setting a priority indication in the priority filed thereof is within the contract bandwidth, the priority field of the other packets transmitted from the user is automatically rewrite to a value corresponding to the priority indication by a node located at the entrance of the network, whereby the network operator can provide a service which permits the effective use of the contract bandwidth. By applying the bandwidth monitoring unit having a function of rewriting the contents of the priority field of non priority packets to a node at the entrance of the network, such a bandwidth monitoring device is realized that can offer a communication service in which the utility efficiency of the contract bandwidth is improved.

According to the present invention, when the network user transmits packets to the network without setting the priority field, and the node at the entrance of the network determines priority packets and non priority packets according to a priority packet decision policy contracted between the network operator and the network user, the following effects are brought about.

When it is found in the above decision that the bandwidth of the priority packets is less than the limit of contract bandwidth, by automatically changing the contents of the priority field of packets judged as the non priority packet to a value corresponding to that of the priority packet, it is possible to provide a service which permits the network user to effectively use the contract bandwidth.

What is claimed is:

1. A bandwidth monitoring device suitable for use in a network on which specific type of packets are transferred in preference to packets other than the specific type of packets, comprising:
   a receiving unit for receiving a packet from a specific source:
   a detecting unit for detecting flow of the received packet by judging whether the received packet coincides with a flow condition pre-defined with at least one of in-header information items other than priority information;
   a determining unit for determining whether the received packet is of the specific type or not based on the result of the detected flow;
   a monitoring unit for monitoring whether the received packet violates a contract bandwidth for the specific type of packets under a contract with the specific source; and
   a transmitting unit for transmitting the received packet after converting it to a packet having a specific value in its header that is indicative of the specific type of packets when the received packet does not violate the contract bandwidth for the specific type of packets and the received packet does not correspond to the specific type of packets.

2. The bandwidth monitoring device according to claim 1, wherein the header of the received packet has a priority field indicating priority information; and
   the detecting unit judges as to whether the received packet corresponds to the specific type of packets based on a value in the priority field.

3. The bandwidth monitoring device according to claim 1, wherein said monitoring by the monitoring unit is carried out by using a leaky bucket algorithm with a first depth of bucket when the received packet does not correspond to the specific type of packets, and a leaky bucket algorithm with a second depth of bucket different from the first depth when the received packet corresponds to the specific type of packets, thereby to judge whether or not the received packet violates the contract bandwidth for the specific type of packets under the contract with the specific source.

4. The bandwidth monitoring device according to claim 1, wherein the transmitting unit transmits the received packet as a packet other than the specific type of packets when the received packet violates the contract bandwidth for the specific type of packets and the received packet corresponds to the specific type of packets.

5. A bandwidth monitoring device suitable for use in a network on which specific type of packets are transferred in preference to packets other than the specific type of packets, comprising:
   a monitoring unit for monitoring whether a received packet violates a contract bandwidth under a contract with a source of the received packet regardless of whether the received packet is of the specific type or not;
   a determining unit for determining whether the received packet is of the specific type or not; and
   a converting unit for converting a value in a header of the received packet that is indicative of a priority of the received packet to a specific value in its header that is indicative of the specific type of packets when packets of the specific type do not violate the contract bandwidth and the received packet is determined to be not of the specific type by the determining unit and the received packet do not violate the contract bandwidth.

6. The bandwidth monitoring device of claim 5, wherein the determining unit determines whether the received packet is of the specific type or not based on the value in the header of the received packet that is indicative of a priority of the received packet.

7. The bandwidth monitoring device of claim 5, wherein there is a priority field in the header of the received packet that contains the value that is indicative of the priority of the received packet.

8. The bandwidth monitoring device of claim 5, wherein the monitoring unit monitors whether the received packet violates a contract bandwidth by using a leaky bucket algorithm using a bucket that has a first depth for the specific type of packets and a second depth for packets other than the specific type.

9. The bandwidth monitoring device of claim 5, wherein the converting unit converts a value in a header of the received packet that is indicative of a priority of the received packet to another specific value in its header that is indicative of other than the specific type of packets when packets of the specific type violate the contract bandwidth and the received packet is determined to be of the specific type by the determining unit.

* * * * *